B. MORGAN.
HOSE COUPLING.
APPLICATION FILED APR. 8, 1910.

978,619.

Patented Dec. 13, 1910.

WITNESSES:
George Bambay.

INVENTOR
Bernard Morgan
BY
ATTORNEYS

UNITED STATES PATENT OFFICE.

BERNARD MORGAN, OF NEWPORT, RHODE ISLAND.

HOSE-COUPLING.

978,619.  Specification of Letters Patent.  Patented Dec. 13, 1910.

Application filed April 8, 1910.  Serial No. 554,095.

*To all whom it may concern:*

Be it known that I, BERNARD MORGAN, a subject of the King of Great Britain, and a resident of Newport, in the county of Newport and State of Rhode Island, have invented a new and Improved Hose-Coupling, of which the following is a full, clear, and exact description.

The invention relates to hose couplings, such as shown and described in the Letters Patent of the United States, No. 909,200, granted to me on January 12, 1909.

The object of the present invention is to provide a new and improved hose coupling, which is simple and durable in construction, readily adjustable for hose of different sizes, and arranged to permit convenient placing of the coupling in position and to securely fasten the parts, such as a hose and pipe, together. For the purpose mentioned, use is made of a shoe adapted to be seated on a base and having a slotted cross bar and a clamping band encircling the hose, and having a slotted hook engaging the said cross bar, the slots in the said cross bar and the said hook being in register, and a tightening device having members, of which one engages the free end of the said clamping band and extends in the said registering slots and the other member operates on the said first-named member and engages the said hook.

A practical embodiment of the invention is represented in the accompanying drawings forming a part of this specification, in which similar characters of reference indicate corresponding parts in all the views.

Figure 1:
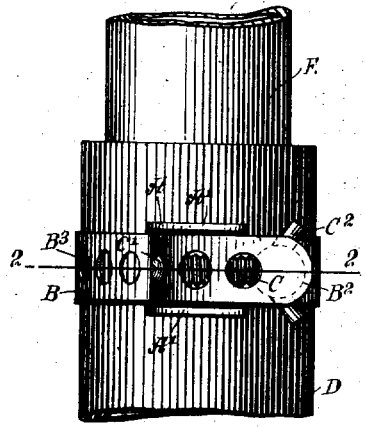
Figure 2:
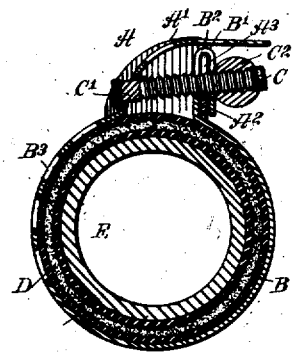
Figure 3:
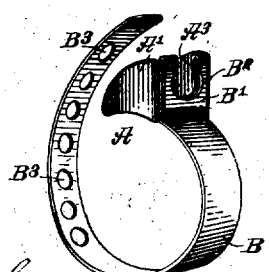

Figure 1 is a plan view of the improvement as applied; Fig. 2 is a cross section of the same on the line 2—2 of Fig. 1; Fig. 3 is a perspective view of the clamping band and shoe; and Fig. 4 is a perspective view of the shoe.

Figure 4:
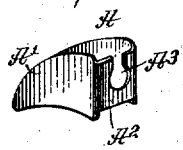

The shoe A of the hose coupling is preferably made of sheet metal, and is formed of two cheek pieces A', connected with each other at one end by a cross bar $A^2$, provided with a slot $A^3$ extending downward from the top of the cross bar, as plainly indicated in Figs. 2, 3 and 4. The cross bar $A^2$ of the shoe A is adapted to be engaged by a hook B', formed on one end of a clamping band B, and the said hook B' is provided with a slot $B^2$, registering with the slot $A^3$, the slot $B^2$ being formed by providing the blank, from which the band B is made, with an elongated slot near one end of the band B and then bending back the end to form the hook and provide the slot registering with the slot $A^3$ of the cross bar $A^2$. The free end $B^2$ of the clamping band B is provided with a series of spaced apertures $B^3$, one of which is adapted to be engaged at a time by the headed end C' of a bolt C, extending through the registering slots $A^3$, $B^2$, as plainly shown in Fig. 2. A nut $C^2$ screwing on the outer end of the bolt C abuts against the outer end of the hook B', and when the clamping band B encircles the hose D and the nut $C^2$ is screwed up, then the clamping band B is drawn tightly around the hose D, so as to securely couple the same to a pipe E extending within the hose D.

In practice, I prefer to make the nut $C^2$ in the form of a wing nut, which can be conveniently turned by the operator, and when the nut $C^2$ is unscrewed from the bolt C, the latter can be placed in any one of the apertures $B^3$, to permit of fastening the clamping band B on a hose of any desired size.

The bottom edges of the cheek pieces A' of the shoe A are rounded off, so as to fit the exterior surface of the hose D, thus insuring firm seating of the shoe A on the said hose when using the clamp for fastening the hose in position on the pipe E.

It is understood that when the several parts are assembled, as indicated in Figs. 1 and 2, and the nut $C^2$ is screwed up, then the band B is drawn tightly around the hose D, to securely fasten the same in position on the pipe E. After the tightening is completed the terminal of the band B can be bent over, as indicated in Fig. 2, so that it does not project unduly beyond the hose.

Having thus described my invention, I claim as new and desire to secure by Letters Patent—

1. A hose coupling, comprising a shoe adapted to be seated on the hose and having a slotted cross bar, a clamping band for encircling the hose and having a slotted hook engaging the said cross bar, the slots in the said cross bar and the said hook being in register, and a tightening device having members, of which one engages the free end of the said clamping band and extends in the said registering slots, and the other member operates on the said first-named member and engages the said hook.

2. A hose coupling, comprising a shoe adapted to be seated on the hose and having a slotted cross bar, a clamping band for encircling the hose and having a slotted hook engaging the said cross bar, the slots in the said cross bar and the said hook being in register, and a bolt held on the free end of the said clamping band and extending in the said registering slots, the nut of the bolt abutting against the outer end of the said hook.

In testimony whereof I have signed my name to this specification in the presence of two subscribing witnesses.

BERNARD MORGAN.

Witnesses:
A. O'D. TAYLOR, Jr.,
A. O'D. TAYLOR.